Oct. 21, 1941.  C. JOHNSON  2,259,472

DUPLICATOR FOR MACHINE TOOLS

Filed Oct. 6, 1939   5 Sheets-Sheet 1

Inventor
CLARENCE JOHNSON
By Raymond D. Junkins
Attorney

Oct. 21, 1941.                C. JOHNSON                2,259,472
                      DUPLICATOR FOR MACHINE TOOLS
                Filed Oct. 6, 1939            5 Sheets-Sheet 3
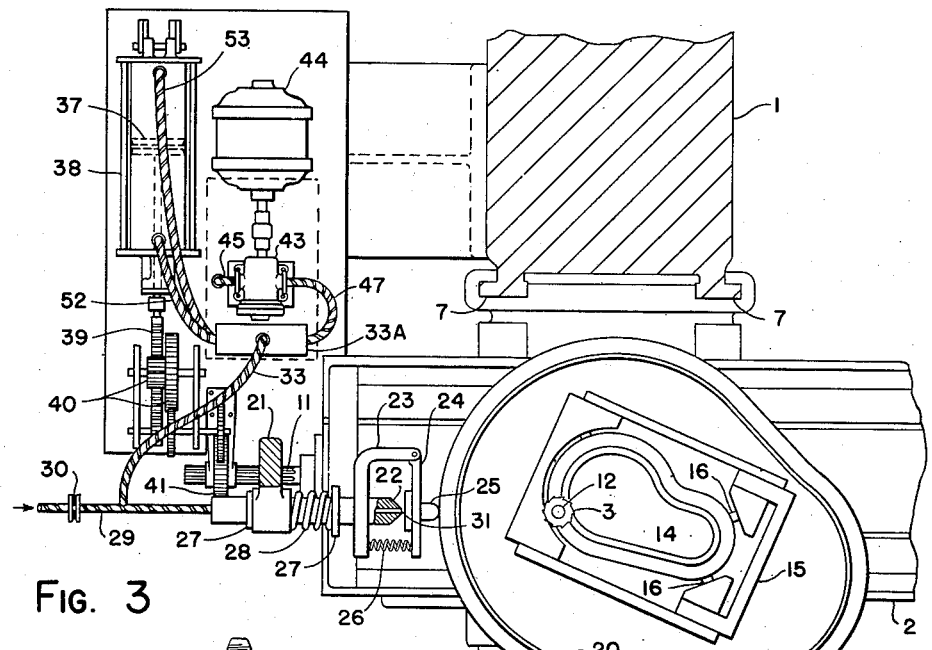
FIG. 3
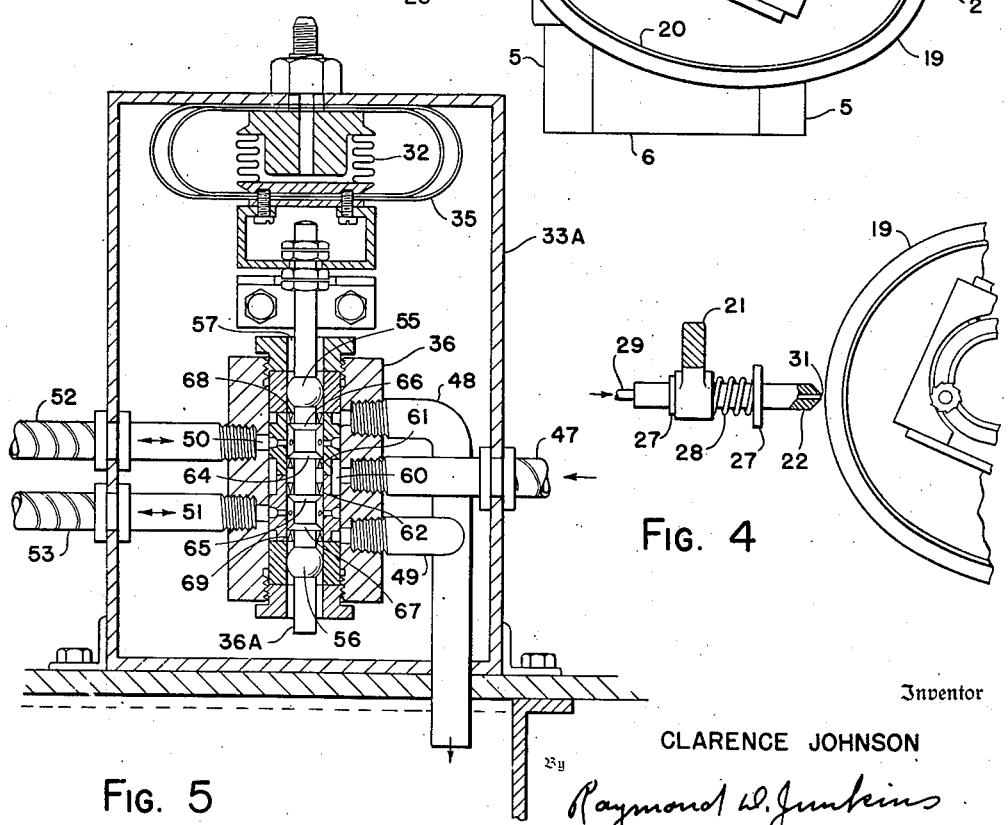
FIG. 4
FIG. 5
Inventor
CLARENCE JOHNSON
By Raymond W. Junkins
                    Attorney

CLARENCE JOHNSON

Patented Oct. 21, 1941

2,259,472

UNITED STATES PATENT OFFICE 2,259,472

DUPLICATOR FOR MACHINE TOOLS

Clarence Johnson, Cleveland Heights, Ohio, assignor to Bailey Meter Company, a corporation of Delaware Application October 6, 1939, Serial No. 298,290

9 Claims. (Cl. 90—13.5)

This invention relates to duplicators for controlling the operation of a machine tool so that it forms a work piece to a contour or configuration determined by a template or cam.

One of the objects of my invention is to improve the sensitivity of duplicators of the type described and thereby increase the accuracy with which the work piece is formed.

A further object of my invention is to provide a duplicator of materially simpler construction than those now available.

A further object of my invention is to provide a duplicator employing no moving parts in the feeler mechanism scanning the template or cam.

In accordance with my invention the template or cam for producing the desired configuration on the work piece is scanned by a jet of fluid issuing from a nozzle so that variations in the shape of the template cause corresponding changes in the fluid discharged from the nozzle, which changes in turn control the positioning of the tool relative to the work piece.

Further, in accordance with my invention changes in the fluid discharged from the nozzle effect corresponding variations in the pressure of the fluid in the nozzle, which latter variations are used to control the relative positioning of the tool and work piece.

Further, in accordance with my invention the changes in fluid pressure control the relative positioning of the tool and work piece through a hydraulic relay and servo-motor, to the end that ample power is available for accurately positioning the tool relative to the work piece.

Obviously a duplicator of the type forming the subject matter of my invention may be employed with machine tools of various types, such as milling machines, lathes, slotters, planers, and other types in which the relative feed between the cutter and work may be suitably controlled. By way of example I will illustrate and describe my invention as applied to two specific types of machine tools. Further applications and modifications of my invention will be readily apparent.

In the drawings:

Fig. 3 is a sectional view taken along the line 3—3 of Figs. 1 and 2 in the direction of the arrows.

Fig. 4 illustrates a modified form of nozzle scanning mechanism.

Fig. 5 is a cross sectional view of a pilot valve for controlling the flow of fluid to and from a hydraulic servo-motor for regulating the relative feed of the tool and work piece.

Figure 1:
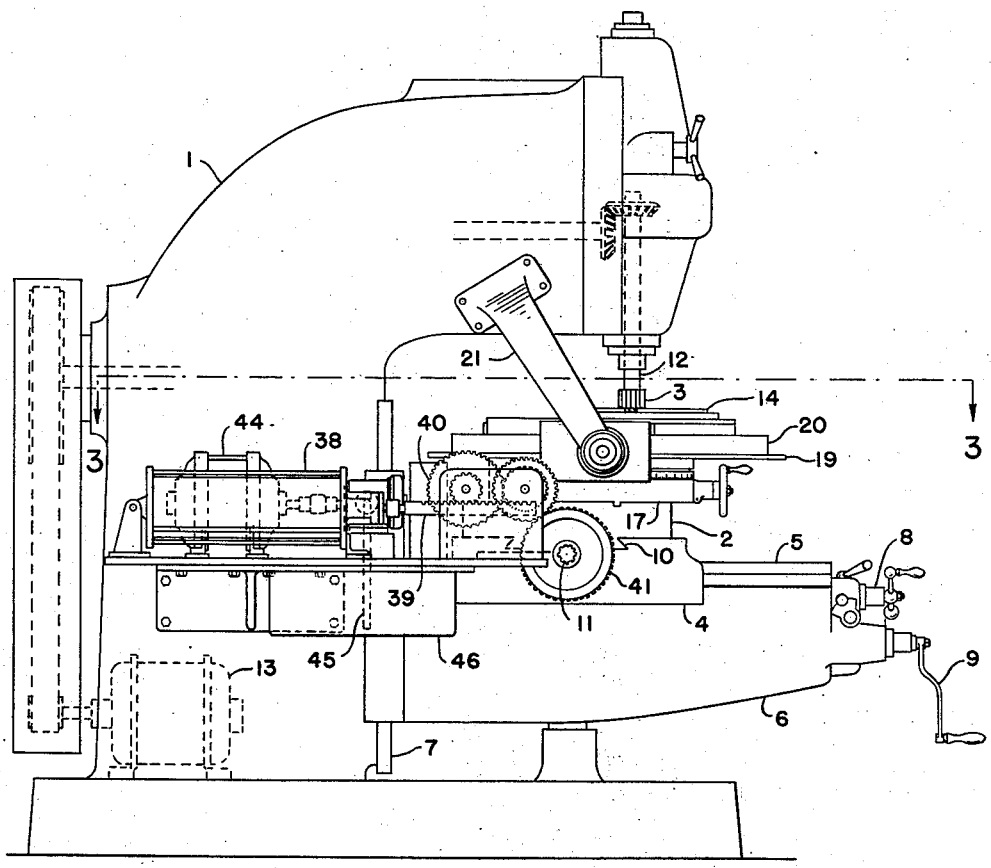
Fig. 1 is a side elevation and Fig. 2 is a front elevation of a vertical milling machine illustrating the application of my invention thereto.
Figure 2:
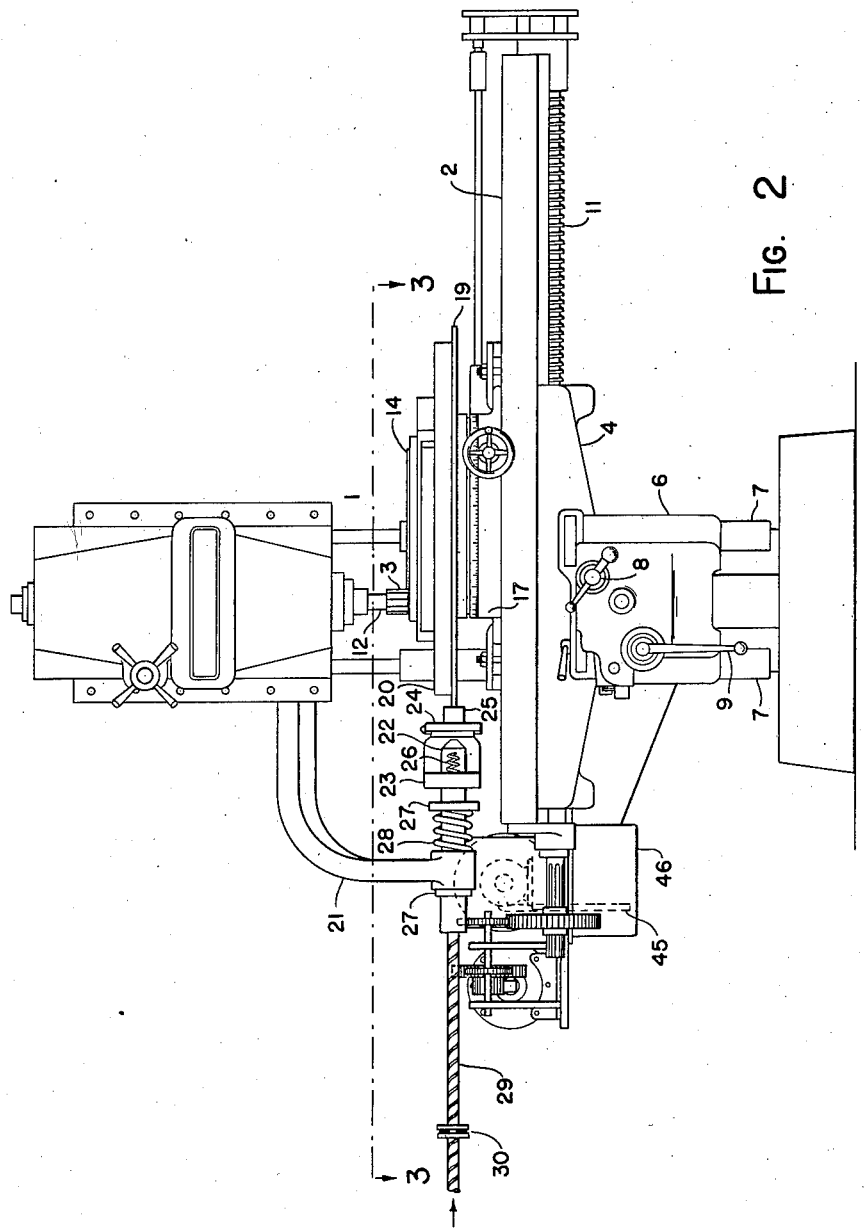

Referring now to Figs. 1, 2 and 3, I therein show a vertical milling machine having a column 1, a work table 2, and a rotatable form milling cutter 3. The work table 2 is carried in a saddle 4 mounted on horizontal guideways 5 carried by a knee 6 which is supported in vertical guideways 7 formed on the column 1. A micrometer hand wheel 8 is provided for positioning the saddle 4 along the guideways 5. A similar hand wheel 9 is provided for positioning the knee 6 along the vertical guideways 7. The work table 2 is mounted on a horizontal guideway 10 formed in the saddle 4 and is positionable relative thereto by a lead screw 11. The cutter 3 is secured to a spindle 12 rotated by a motor 13, which may be further adapted to position the work table 2 along one or more of the guideways as is well known.

At 14 is shown a typical work piece consisting of a concave forging of more or less elliptical shape and in rough form having a raised blank face extending around its entire periphery. The machining operation which I have chosen to illustrate my invention includes forming a male flange face on this outer face. The cutter 3 is suitably shaped to relieve the outer edge of the flange, and by my invention the work piece is automatically moved relative to the cutter so that the latter accurately forms the outer profile of the raised portion of the flange.

The work piece 14 is shown as being secured to a fixture 15 by adjustable clamping means 16. Because of the nature of the machining operation to be performed the fixture 15 is mounted on a circular table 17 secured to the work table 2 and rotatable at desired speed by the motor 13 through suitable reducing gears and shafting (not shown). The machining of the work piece 14 is completed in one revolution of the circular table 17, during the revolution the work piece being moved relative to the cutter 3 to accurately profile the male flange by means now to be described.

The fixture 15 has a horizontally extending skirt 19 forming a cam or template, the contour of which is formed to produce the desired contour of the raised portion of the flange on the work piece 14. A raised barrier 20 is preferably employed to hold chips cut from the work piece from scattering.

Fastened to the column 1 is an arm 21 in which is journaled a nozzle 22. Secured to the nozzle is an extension 23 which pivotally supports a follower 24 having a projection 25 urged against the cam or template 19 by a spring 26. The nozzle 22 is preferably resiliently journaled in the arm 21 by means of spaced collars 27 and spring 28, which provide for lateral movements, thereby preventing injury to the nozzle in the event that the follower 24 is inadvertently jammed against it.

The nozzle 22 is connected to a suitable source of pressure fluid (not shown), such as compressed air, by a flexible tube 29 in which is inserted an orifice or other partial restriction 30. Normally therefore a jet of fluid is continuously discharged from the port 31 against the follower 24, which acts as a valve member for the port, its movements toward and away from the port governing the rate of discharge of fluid therefrom. That is to say, when the follower 24 is positioned to the left, or closer to the port 31, as shown in Fig. 3, the rate of discharge from the port is decreased, whereas when the follower 24 is positioned to the right, or away from the port, the rate of discharge from the nozzle increases. Such changes in the rate of discharge from the port effect corresponding changes in the pressure of the fluid within the nozzle, a decrease in the rate of discharge effecting an increase in the pressure of the fluid within the nozzle, whereas an increase in the rate of discharge effects a corresponding decrease in fluid pressure.

As the template 19 and the work piece 14 are rotated by the circular table 17 the follower 24 will be positioned toward and away from the port 31 in accordance with changes in the configuration of the template. Such positioning of the follower 24 effects changes in the pressure of the fluid within the nozzle 22. These pressure variations are effective for positioning the work table 2, to return the follower 24 to the normal distance from the port 31. Inasmuch as in the embodiment of my invention illustrated in Figs. 1, 2 and 3 the cutter 3 is stationary, as is also the nozzle 22, it follows that if the work table 2 is positioned to maintain a normal distance between the follower 24 and port 31 the work piece 14 will upon completion of the machining operation have a configuration determined by the configuration of the template 19.

Inasmuch as the circular table 17 rotates, whereas the work piece may have a shape other than circular, and furthermore may not be concentrically located on the table with respect to the center of rotation thereof, it follows that the periphery of the work piece will not be a duplicate of that of the template 19. The proper contour of the template to give the desired shape to the work piece may be determined, as evident to those skilled in the art, by calculation or graphically.

Changes in the shape and size of the projection 25 relative to that of the cutter 3 will also modify the shape of the template 19 necessary to produce a desired shape of the work piece 14. In some instances the design of the template 19 is somewhat simplified by having the projection 25 the same shape and size as the cutter 3, and therefore I usually find it desirable to employ the construction shown in Fig. 3. However, in some instances it may be preferable to employ the construction shown in Fig. 4. As shown, the follower 24 and projection 25 are eliminated. The nozzle 22 is located immediately adjacent the template 19 so that the template itself acts as the valve member for the port 31. Other than this the construction and operation will be as described with reference to Fig. 3.

Pressures established within the nozzle 22 are transmitted through a flexible tube 33 to a relay within a protecting housing 33A and shown in cross section in Fig. 5. The tube 33 connects with the interior of a bellows 32 secured to a wall of the housing 33A. The force produced by the fluid pressure acts against the lower or free head of the bellows and is opposed by the inherent resiliency of the bellows and by an elliptical spring 35. The free head of the bellows will therefore assume a position corresponding to the magnitude of the fluid pressure. Movements of the lower head of the bellows position a movable valve member 36A of a hydraulic pilot valve 36 to control the flow of hydraulic fluid to and from a servo-motor 38 having a piston 37 operating the lead screw 11 through a rack 39, spur gears 40, and a final gear 41 which is splined to the lead screw to permit relative axial movement.

Assuming now that the normal distance exists between the port 31 and follower 24 a definite pressure will exist within the bellows 32, which by adjustment of the spring 35 will cause the valve member 36A to assume a neutral position, i. e. a position in which no hydraulic fluid passes between the pilot valve 36 and servo-motor 38. If now the follower 24 moves toward the port 31 the pressure within the bellows 32 will increase, causing a downward positioning of the valve member 36A, a passage of hydraulic fluid between the pilot valve 36 and servo-motor 38 causing the piston 37 to move the work table 2 in a direction to restore the port 31 and follower 24 to normal distance. Upon a decrease in fluid pressure within the bellows 32 the servo-motor 38 will position the work table 2 in opposite direction, thereby positioning the follower 24 toward the port 31 until normal distance is restored. It is apparent that by proper shaping of the template 19 the follower 24 may be moved toward and away from the port 31 as the circular table 17 revolves to effect corresponding movements of the work table 2 relative to the cutter 3 to effect accurate shaping of the work piece 14.

Hydraulic fluid, such as oil, used in positioning the piston 37 of the servo-motor 38 may be pumped by any suitable means, such as the oil pump 43 driven by a motor 44. The pump 43 is provided with an inlet pipe 45 extending into an oil reservoir 46, and a discharge pipe 47 which is connected to the inlet port 60 of the pilot valve 36. Hydraulic fluid returned from the servo-motor 38 to the pilot valve is passed to the reservoir 46 through exhaust pipes 48 and 49.

The pilot valve 36 is provided with outlet ports 50 and 51. The former being in communication with one side of the piston 37 through a pipe 52, and the latter in communication with the opposite side of the piston through a pipe 53. Downward positioning of the valve member 36A connects the outlet port 50 to the pump 43 and the outlet port 51 with the exhaust pipe 49, whereas upward positioning of the valve member connects the outlet pipe 51 with the pump 43 and the outlet port 50 with the exhaust pipe 48.

The movable valve member 36A is provided with sealing glands 55 and 56, which are of substantially the same diameter as the passageway 57 extending longitudinally through the pilot valve. Oil from the pump 43 admitted under pressure through pipe 47 to the inlet port 60 which is in the form of an annular chamber. The port 60 is in communication with the passageway 57 through a plurality of equally spaced upper V-ports 61 and a similar plurality of lower V-ports 62. With the valve member 36A in the neutral position, that is in the position occupied when the follower 24 is the normal distance from the port 31, then a land 64 restricts communication between V-ports 61 and outlet port 50. Likewise a land 65 restricts communication between V-ports 62 and outlet port 51. When, however, the valve member 36A is positioned downwardly, for example, the V-ports 61 are partially uncovered so that communication is established between the inlet pipe 47 and the outlet port 50. The area of the uncovered V-ports 61 depends upon the displacement of the valve member 36A from the neutral position, and accordingly the flow of oil from the inlet pipe 47 to the outlet port 50 will vary depending upon the displacement of the valve member. Conversely upon upward positioning of the valve member 36A from the neutral position a portion of the V-ports 62 will be uncovered, thereby permitting a proportionate flow of pressure fluid from the inlet pipe 47 to the outlet port 51.

Also carried by the valve member 36A are lands 66 and 67 cooperating with spaced V-ports 68 and 69 respectively to control the flow of pressure fluid from the outlet port 50 to the exhaust pipe 48, and from the outlet port 51 to the exhaust pipe 49. It will be noted that upon downward positioning of the valve member 36A, which establishes communication between the inlet pipe 47 and outlet port 50, communication is likewise established between the outlet port 51 and exhaust pipe 49. Pressure fluid is thus transmitted through pipe 52 to one side of the piston 37 and simultaneously withdrawn from the opposite side of the piston through pipe 53 to exhaust port 49. Upward positioning of the valve member 36A from the neutral position results in opposite action, in this instance pressure fluid being transmitted from inlet pipe 47 through pipe 53, to one side of piston 37. Pressure fluid is simultaneously withdrawn from the opposite side of piston 37 through pipe 52 to outlet port 50, and thence to exhaust pipe 48. It will be noted that whenever the valve member 36A is in other than the neutral position, the piston 37 will continue to move in predetermined direction. Accordingly, upon the follower 24 being in other than the normal position, the work table 2, and the work piece 14 will be positioned until normal distance is restored. It is further evident that the rate at which the table 2 will be positioned will be dependent upon the amount of displacement of the follower 24 from the normal position relative to the port 31. If a sudden change in contour of template 19 occurs, the table 2 will be rapidly positioned but upon a relatively slow rate of change in the contour of the template a correspondingly slow change in position of the table 2 will occur. Thus the pilot valve 36 will cause the work piece to be accurately positioned relative to the cutter without overshooting or hunting.

Preferably the sealing lands 55 and 56 are of substantially the same diameter as the passageway 57, thereby preventing material leakage of oil. The lands 64, 65, 66 and 67 are however of a somewhat less diameter than the passageway 57, thereby preventing undue friction and permitting the member 36A to be freely positioned in the passageway. The pressure transmitted from the inlet pipe 47 to outlet ports 50 and 51, with the member 36A in neutral position, because the lands 64 and 65 may be of somewhat less diameter than the passageway, will not affect the accuracy with which the piston 37 is positioned for such pressures will be equal and act in opposite direction on the piston 37. It will further be noted that the flows into and out of the passageway 57 are radial, so that there is no reaction on the member 36A because of the velocity of flow into and out of the passageway. Furthermore, the pressures are axially balanced due to the equal areas of lands 64, 65, 66 and 67 so that no reaction exists due to the resultant of the oil pressures acting in an upward or downward direction.

Figure 6:
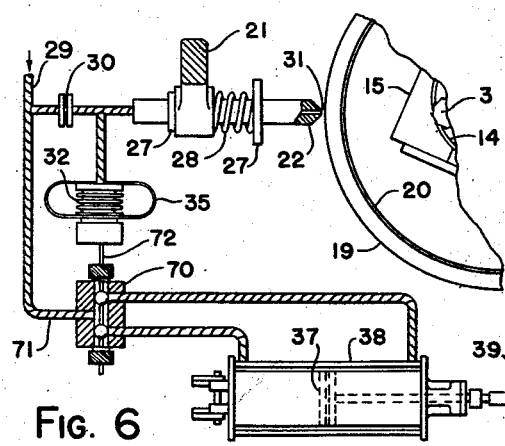
Fig. 6 illustrates diagrammatically a modified form of fluid pressure system.

While in general I have found it preferable to operate the table 2 or comparable device indirectly from the fluid pressures established within the nozzle 22 by means of a hydraulic relay, in some instances where a relatively light machining operation is being performed, or an extreme degree of accuracy is not required, I have found it possible to dispense with the hydraulic relay system and employ in its stead a pneumatic relay system as shown in Fig. 6.

Therein I show fluid pressure, such as compressed air, transmitted from the pipe 29 ahead of the orifice 30 to a pilot valve 70 by a pipe 71. The pilot 70 shown in cross-section may be so constructed that downward positioning of the movable valve member 72 permits pressure fluid to be transmitted to one side of the piston 37 and simultaneously exhausts pressure fluid from the opposite side of the piston 37. Conversely upon upward positioning of the member 72 reverse operation of the piston 37 will occur. When the normal distance exists between port 31 and template 19 the member 72 is positioned so that the lands thereon are adjacent the outlet ports leading to the servo-motor 38.

Figure 8:
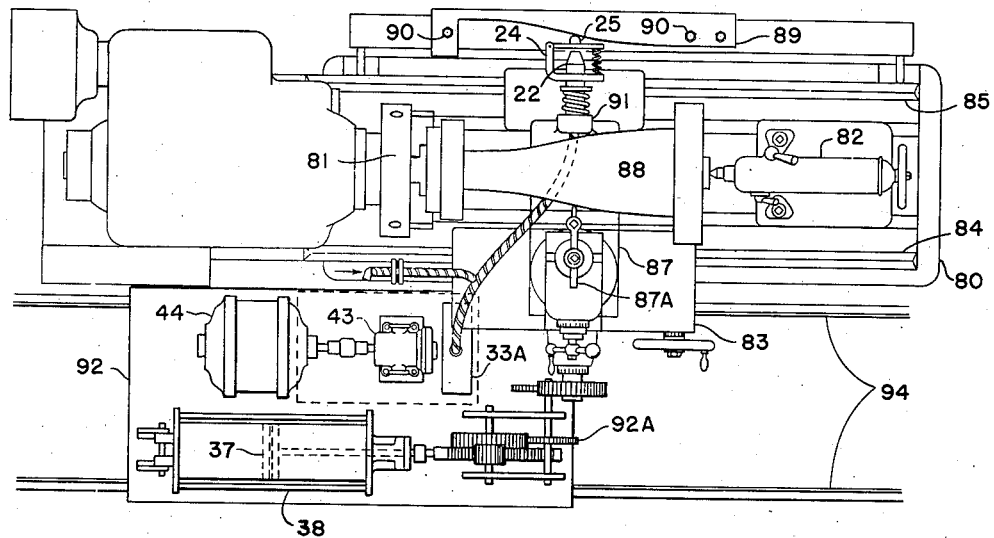
Fig. 7 is a side elevation and Fig. 8 is a plan view of an engine lathe showing the application of my invention thereto.
Figure 7:
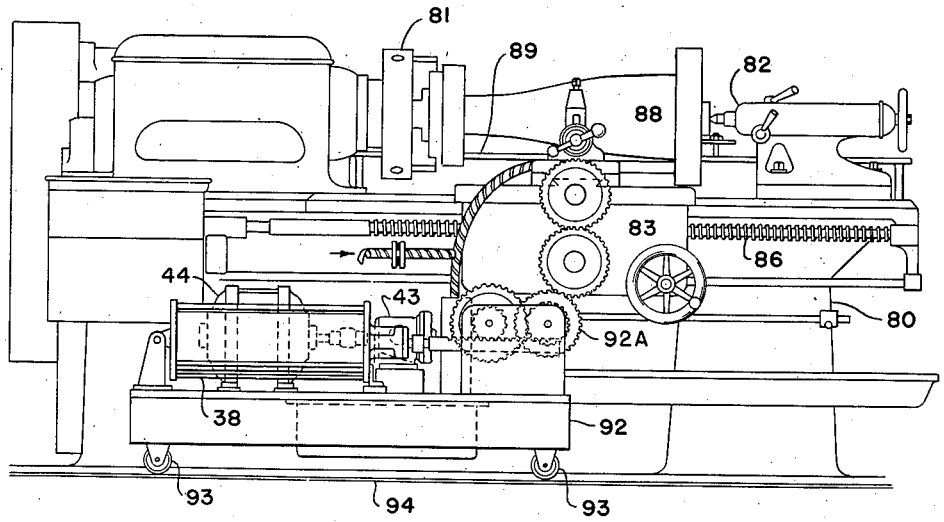

In the embodiments of my invention so far described the work piece has been moved, whereas the cutter or tool has remained stationary. In Figs. 7 and 8 I disclose a further embodiment of my invention in conjunction with an engine lathe wherein the work piece remains in fixed position and the tool, or cutter, is moved. It will be evident to those skilled in the art however that in all of the embodiments it is the relative movement between the work piece and the tool which is of importance and which is controlled by my invention.

Referring to Figs. 7 and 8 I therein show a typical engine lathe having a bed 80, rotatable face plate 81, and tail stock 82. It is further provided with a carriage 83 movable on guideways 84, 85 longitudinally along the bed 80. Normally the longitudinal movement of the carriage is controlled by a feed screw 86, which may be driven by any suitable source of power (not shown) at any desired speed by means of suitable reducing gears (not shown).

Mounted on the carriage 83 is a cross-slide 87 carrying a tool holder and tool 87A which by way of example I have shown as forming a work piece 88 into general irregular conical form. In the embodiment of my invention shown the transverse motion of the cross-slide 87 is automatically controlled so that the work piece 88 is formed to correspond in shape to a template 89, which is secured to the bed 80 of the lathe by suitable clamping means 90.

The system for positioning the tool 87A relative to the work piece 88 is substantially the same as that described for positioning the cutter 3 relative to the work piece 14. Nozzle 22 is resiliently mounted in an arm 91 secured to the cross-slide 87. The projection 25 of the follower 24 bears against the edge of the template 89, which has a contour to which the work piece 88 is to be shaped. Pressures established in the nozzle 22 are transmitted to the relay 33A, which in turn acts to control the positioning of the piston 37 in servo-motor 38. Positioning of the piston 37 controls the transverse positioning of the tool 87 through a rack 39 and suitable gears 92A.

In order that the servo-motor 38, relay 33A and associated apparatus may move with the cross-slide 87 longitudinally along the lathe they are shown mounted on a truck 92 provided with flanged wheels 93 riding on rails 94. The truck 92 is secured to the carriage 83 so that the servo-motor is maintained at proper operating distance from the cross-slide 87.

In operation, as the template 89 changes in shape corresponding variations in pressure within the nozzle 22 occur, which effect transverse operation of the cross-slide 87 to maintain the follower 24 at normal distance from the port 31. Simultaneously, the tool 87A is moved transversely so that the work-piece 88 assumes the same shape as the template 89. The cross-slide 87 is moved longitudinally by the feed screw 86 and carriage 83 at desired speed by any suitable source of power as heretofore described.

In the embodiments of my invention illustrated I have shown the lead screw of a machine tool operated by a servo-motor comprising a piston and a cylinder. It is evident that other types of servo-motors may be used such, for example, as hydraulic motors and the like. Because of the positive action and relative simplicity of a piston and cylinder type of servo-motor I find it preferable to use in most instances. The sole disadvantage of this type of servo-motor in the past has been that in those instances where materially great changes in the contour of the template occur, in order to provide corresponding movements of the work piece relative to the tool a cylinder and rack of too great length to be practical was required. I have devised a system, however, whereby a cylinder and rack of desired length may be used regardless of the configuration of the template. Because the novelty of my system does not reside in any particular element, but in the novel cooperation between a combination of elements, I have chosen to illustrate the system schematically.

Figure 9:
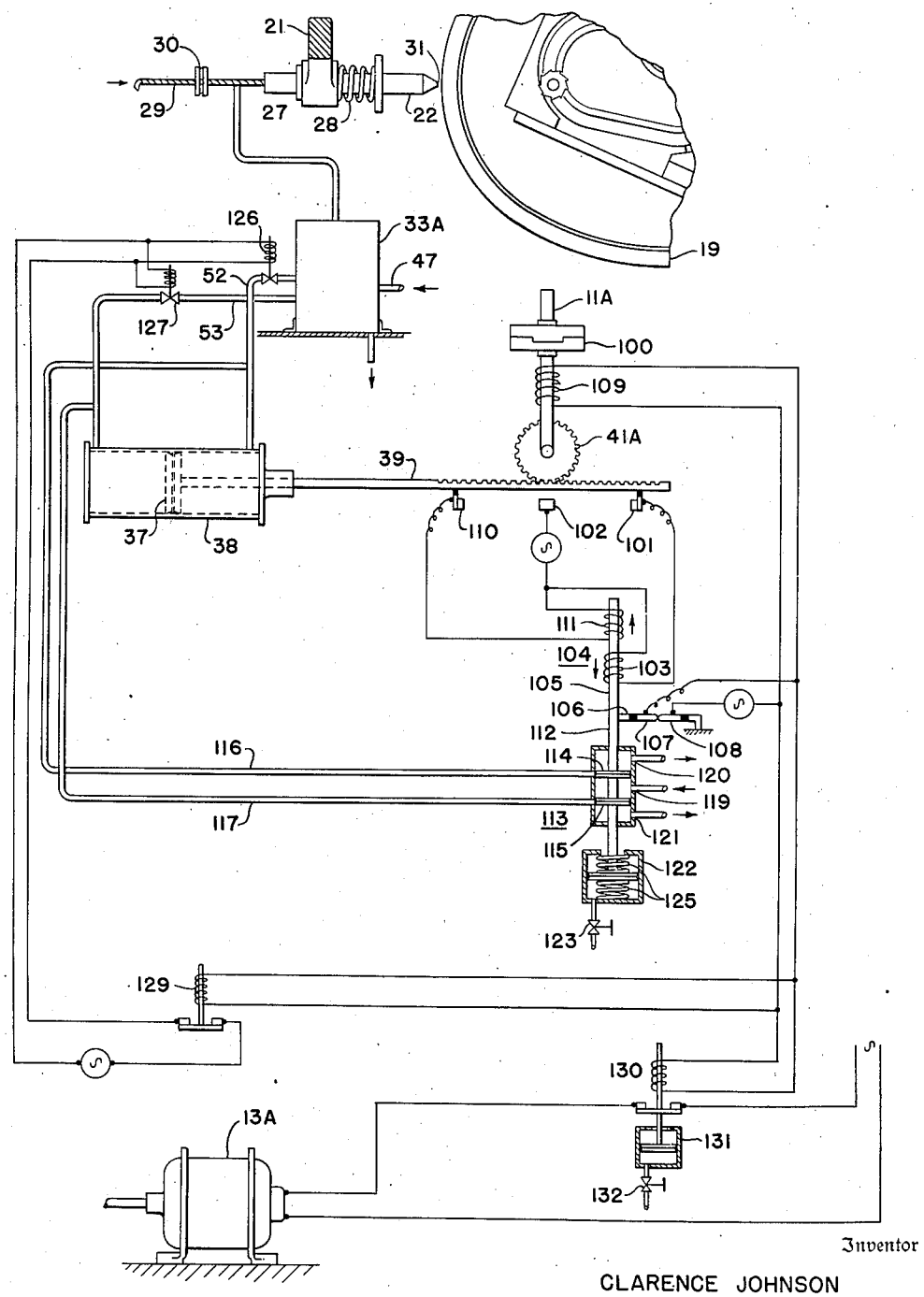
Fig. 9 illustrates a further embodiment of my invention incorporating a modification.

Referring to Fig. 9, I therein show the nozzle 22 and cooperating template 19. It will be evident that if the template 19 has large changes in configuration in order to obtain corresponding changes in relative positions of the work piece and tool, it will be necessary that the lead screw 11A be revolved an exceptionally large number of turns, which ordinarily would require rack 39 and cylinder 38 to be impractically long. In accordance with my invention, however, I employ a rack and cylinder of desired length and when the rack is near the end of its travel in either direction I declutch the lead screw 11A from the gear 41A by means of an electromagnetically operated clutch 100, and simultaneously stop the machine. I then, by means of a high speed reset mechanism, position the piston 37 to or about its mid position. Next, I throw in the clutch 100 and then restart the machine. The operations I have described may be performed entirely automatically so that after the machining operation is once started, it is unnecessary that the operator give it any further attention until the operation is completed.

Describing first the operation whereby the lead screw 11A is declutched from the gear 41A when the rack 39 approaches the end of its travel in one direction, a contact 101 carried by the rack 39 engages a stationary contact 102, thus closing the circuit for the coil 103 of a solenoid 104. The solenoid has a movable armature 105 which is positioned downwardly from its mid or neutral position by energization of the coil 103.

The armature 105 carries a horizontal extension 106 terminating in a contact 107 normally, that is when the coil 103 is not excited, engaging a stationary contact 108. The clutch 100 has a coil 109 which holds the clutch in so that movements of the rack 39 are transmitted to the lead screw 11A. When the coil 109 is deenergized, the clutch 100 is declutched so that regardless of movement of the rack 39, the lead screw 11A remains stationary. As shown, energization of the coil 109 is controlled by contacts 107—108. Thus, upon energization the coil 103 and the armature 105 moving downwardly clutch 100 is opened so that thereafter until contacts 107—108 again engage, the lead screw 11A will remain stationary.

So far as the operation of the clutch 100 is concerned, the same sequence of events occurs upon the rack 39 approaching the end of its travel in opposite direction. In this instance the stationary contact 102 engaging a contact 110 secured to the rack 39 and effecting upward movement of the solenoid 104 due to energization of a coil 111. It will be noted that in this case contacts 107—108 will disengage, thereby deenergizing coil 109 and declutching rack 39 from the lead screw 11A.

The lower end of the armature 105 forms a movable valve member 112 of a pilot valve 113. Carried by the member 112 are lands 114 and 115 normally disposed in a closed position so that hydraulic fluid is neither transmitted to or from pipes 116 and 117. The pilot valve is supplied with oil under pressure from any suitable source (not shown) through an inlet port 119 disposed between lands 114 and 115. The pilot valve also has two exhaust ports 120 and 121.

Pipe 117 leads to pipe 53 connected to the cylinder 38 on one side of piston 37. Pipe 116 is connected to pipe 52, which is connected to cylinder 38 on the opposite side of piston 37.

In normal operation, that is when the clutch 100 permits motion of the rack 39 to be transmitted to the lead screw 11A, the piston 37 is positioned so that the work piece is moved relative to the tool in correspondence with changes in the configuration of the template 19 as heretofore described. During these periods of normal operation, the armature 105 is in the neutral position so that oil is transmitted neither to nor from the pipes 116 and 117. Upon either upward or downward movement of the armature 105 it will be observed, however, that lands 114 and 115 will be displaced from the neutral position thereby permitting hydraulic fluid to be transmitted to one of the pipes 116 or 117 and withdrawn from the other pipe.

In operation upon the contact 101 engaging stationary contact 102, for example, indicating that the rack 39 has reached its approximate travel end in that direction, the armature 105 will move downwardly, thereby connecting inlet port 119 with pipe 117 so that hydraulic fluid will be transmitted to the cylinder 38 and position piston 37 to the right as shown in the drawings so that the rack is restored to a position within its operating range. Simultaneously, with the transmittal of hydraulic fluid to pipe 117, hydraulic fluid will be withdrawn from the opposite side of piston 37 through pipes 52, 116 and exhaust port 120. The operation when the contact 110 engages the stationary contact 102 is similar in this instance to the armature 105 moving upwardly thereby connecting inlet port 119 with pipe 116 so that hydraulic fluid is transmitted to pipe 52 and positioning the rack 39 in opposite direction. Simultaneously, pipe 117 is connected with exhaust port 121 so that hydraulic fluid is withdrawn from pipe 53 and the opposite side of piston 37.

To prevent the armature 105 being restored to the neutral position as soon as disengagement between contact 102 and contact 101 or 110 occurs and, further, to govern the resetting of rack 39, I provide a time delay means, in the drawings shown as a dash pot 122, which may be provided with an adjustable bleed valve 123 to govern the time required for the armature 105 to be repositioned to the neutral position and hence the position to which the piston 37 will be restored after having reached an extreme of travel. Conveniently, the dash pot 122 may be provided with biasing springs 125 to maintain the armature 105 in neutral position during periods of normal operation.

As will be understood by those familiar with the art, I may by proper design of pilot 113 render the relay 33A substantially inoperative during the period of time when the armature 105 is displaced from the mid or neutral position. Thus, I may provide for much greater flows at higher pressures through the pilot 113 so that the operation of the relay 33A has an unappreciable effect upon the positioning of the piston 37 within the cylinder 38. However, I may if desired provide for isolating the relay 33A from the cylinder 38 during periods when the piston 37 is being reset. By way of diagrammatic illustration, I show in pipes 52 and 53 solenoid operated valves 126 and 127 normally energized and in open position so that hydraulic fluid is transmitted freely from the relay 33A to the cylinder 38. The energization of the solenoids 126 and 127 is controlled by a relay 129, the energization of which in turn is controlled by contacts 107—108. Thus as long as contacts 107—108 are closed, the solenoids 126 and 127 are energized. When, however, the armature 105 is displaced from the neutral position, solenoid relay 129 breaks the circuit through solenoid valves 126—127 so that communication between relay 33A and cylinder 38 is stopped. Normal communication will be reestablished when the armature 105 is returned to the neutral position and contacts 107—108 reengage. Thus, if preferable, I may during a reset operation isolate the cylinder 38 so that the piston 37 is controlled solely from pilot 113.

During the reset operation, the machine is preferably stopped to prevent the tool from incorrectly forming the work piece while the clutch 100 is disengaged. To this end I show the motor 13A, driving the machine, as controlled from contacts 107-108. Connected in the motor circuit is a solenoid relay 130 normally energized through contacts 107-108. When these contacts disengage, however, solenoid 130 breaks the circuit to motor 13A. Preferably motor 13A is not restarted until a short increment of time after contacts 107-108 have reengaged. To provide for this I show the solenoid 130 as provided with a dash pot 131 having an adjustable bleed valve 132 so that the delay in restarting the motor 13A after closure of contacts 107-108 may be adjusted. This time delay in restarting motor 13A permits the tool to be accurately adjusted relative to the work piece in the event that such adjustment has been altered during the period of time when the reset operation is taking place.

While in accordance with the patent statutes I have described certain embodiments of my invention, it is evident that such embodiments may be modified in many ways without departing from the spirit and scope of the invention. Such embodiments of my invention as I have chosen to describe should therefore be taken as merely illustrative and not as limiting.

What I claim as new and desire to secure by Letters Patent of the United States is:

1. In a duplicator for machine tools and the like having a relatively movable tool and work piece, means for controlling relative movement between the tool and work piece comprising a port through which fluid is passed from a pressure supply, means responsive to the rate at which fluid is passed through said port for relatively moving the tool and work piece, and a template having the desired shape of the work piece for controlling the rate at which fluid is passed through said port.

2. In a duplicator for machine tools and the like having a relatively movable tool and work piece, means for controlling relative movement between the tool and work piece comprising a nozzle having a port to atmosphere through which fluid is continuously discharged from a pressure supply, means responsive to the rate of fluid discharged from said nozzle for relatively moving the tool and work piece, and a template having the desired shape of the work piece movable relative to said nozzle for controlling the rate of fluid discharged from said nozzle.

3. In a duplicator for machine tools and the like having a relatively movable tool and work piece, means for controlling relative movement of the tool and work piece comprising a control couple one element of said couple forming a nozzle having a port to atmosphere through which fluid is continuously discharged from a pressure supply, and the other element of which affords a valve for said port; relative movement of said elements governing the discharge of pressure fluid from said nozzle; means responsive to the rate of fluid discharged from said nozzle for relatively moving said tool and work piece, and a template having the desired shape of the work piece for relatively moving said elements.

4. In a duplicator for machine tools and the like having a relatively movable tool and work piece comprising, a template having the desired shape of the work piece, a nozzle having a port to atmosphere through which fluid is continuously discharged for scanning the template, the relative approach and recession of said nozzle and template controlling the rate of discharge from said port, and means responsive to the rate of discharge of the pressure fluid for relatively moving the tool and work piece.

5. In a duplicator for machine tools and the like having a relatively movable tool and work piece, a template having a shape corresponding to the desired shape of the work piece, a nozzle having a port to atmosphere for directing a jet of air against said template, means for causing said nozzle to scan said template whereby variations in the shape of said template cause corresponding variations in the rate of air discharged from said nozzle, and means responsive to the rate of air discharged from said nozzle for relatively moving the tool and work piece.

6. In a duplicator for machine tools and the like having a relatively movable tool and work piece for forming said work piece to desired shape, comprising, a template having a shape corresponding to the desired shape of the work piece, a nozzle having a port to atmosphere for directing a jet of air against said template so that said template controls the rate of discharge from said nozzle, means for causing said nozzle to scan said template whereby variations in the shape of said template cause corresponding variations in the rate of air discharged from said nozzle, means for relatively moving said tool and work piece in correspondence with the scanning of said template by said nozzle, and means responsive to the rate of air discharged from said nozzle for relatively moving said tool and work piece whereby variations in the shape of said template are reproduced in said work piece.

7. In a duplicator for machine tools and the like having a relatively movable tool and work piece for forming said work piece to desired shape comprising, a template having a shape corresponding to the desired shape of the work piece, a nozzle having a port to atmosphere for directing a jet of air against said template so that the template controls the rate of discharge from said nozzle, a passageway for transmitting air to said nozzle from a source of supply, a restriction in said passageway, means for causing said nozzle to scan said template whereby variations in the shape of said template cause corresponding variations in the pressure of the air in that portion of the passageway between said restriction and said nozzle, a servo-motor for relatively moving said tool and work piece, and means responsive to the pressure of the air in that portion of the passageway between said restriction and said nozzle for controlling the operation of said servo-motor.

8. A duplicator for machine tools and the like having a relatively movable tool and work piece for forming said work piece to desired shape, comprising, a template having a shape corresponding to the desired shape of the work piece, a nozzle having a port to atmosphere for directing a jet of air against said template so that the template controls the rate of discharge from said nozzle, a passageway for transmitting air to said nozzle from a source of supply, a restriction in said passageway, means for causing said nozzle to scan said template whereby variations in the shape of said template cause corresponding variations in the pressure of the air in that portion of the passageway between said restriction and said nozzle, a hydraulic servo-motor for positioning said tool relative to said work piece, and a pilot valve for controlling the flow of hydraulic fluid to and from said servo-motor responsive to the pressure of the air in the said portion of said passageway between said restriction and said nozzle.

9. A duplicator for machine tools and the like having a relatively movable tool and work piece for forming said work piece to desired shape, comprising, a template having a shape corresponding to the desired shape of the work piece, nozzle means for directing a jet of air against said template, the relative approach and recession of said nozzle and template governing the pressure in said nozzle, a servo-motor for positioning said tool relative to said work piece and simultaneously and in correspondence therewith positioning said nozzle means relative to said template and means responsive to the air pressure in said nozzle for operating said servo-motor to maintain said air pressure at a predetermined value.

CLARENCE JOHNSON.